Dec. 27, 1955     F. D. MARASSO     2,728,508
PAN INDEXING MECHANISM

Filed Dec. 13, 1952     4 Sheets-Sheet 1

INVENTOR
FRED D. MARASSO
BY *Bradley Cohn*
ATTORNEY

Dec. 27, 1955  F. D. MARASSO  2,728,508
PAN INDEXING MECHANISM
Filed Dec. 13, 1952  4 Sheets-Sheet 2

INVENTOR
FRED D. MARASSO
BY Bradley Cohn
ATTORNEY

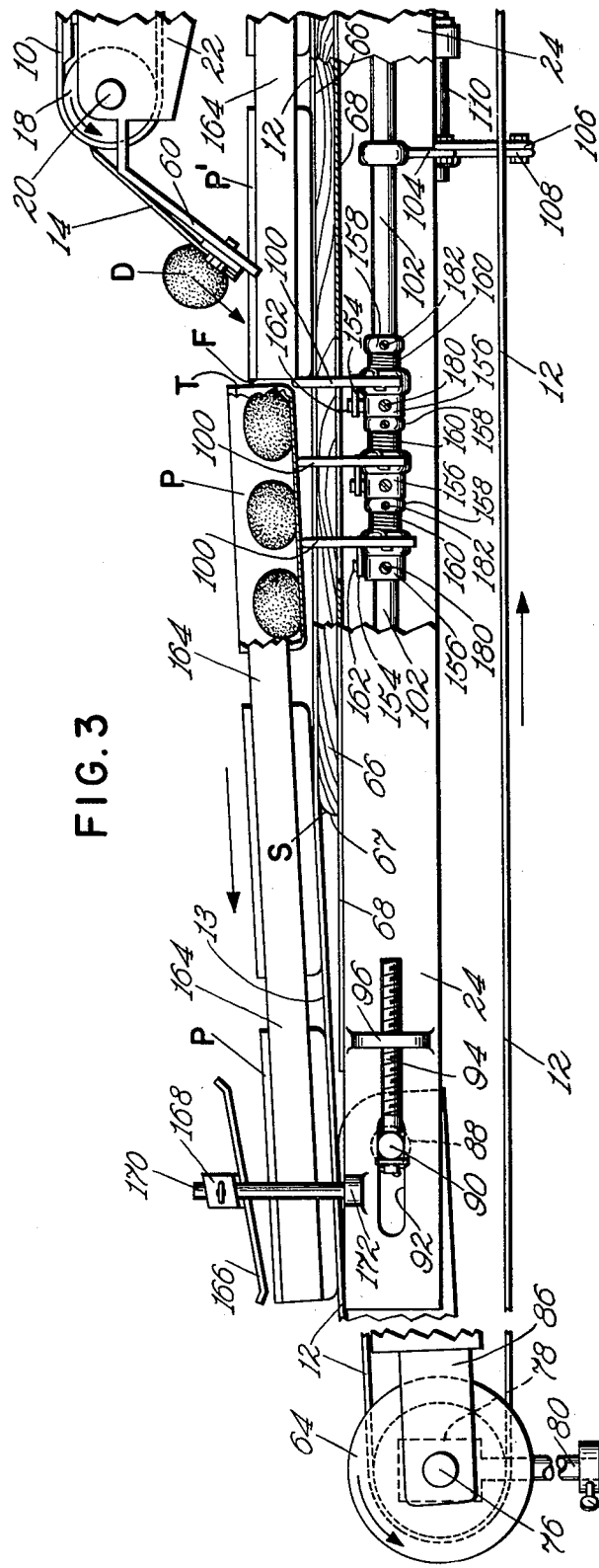

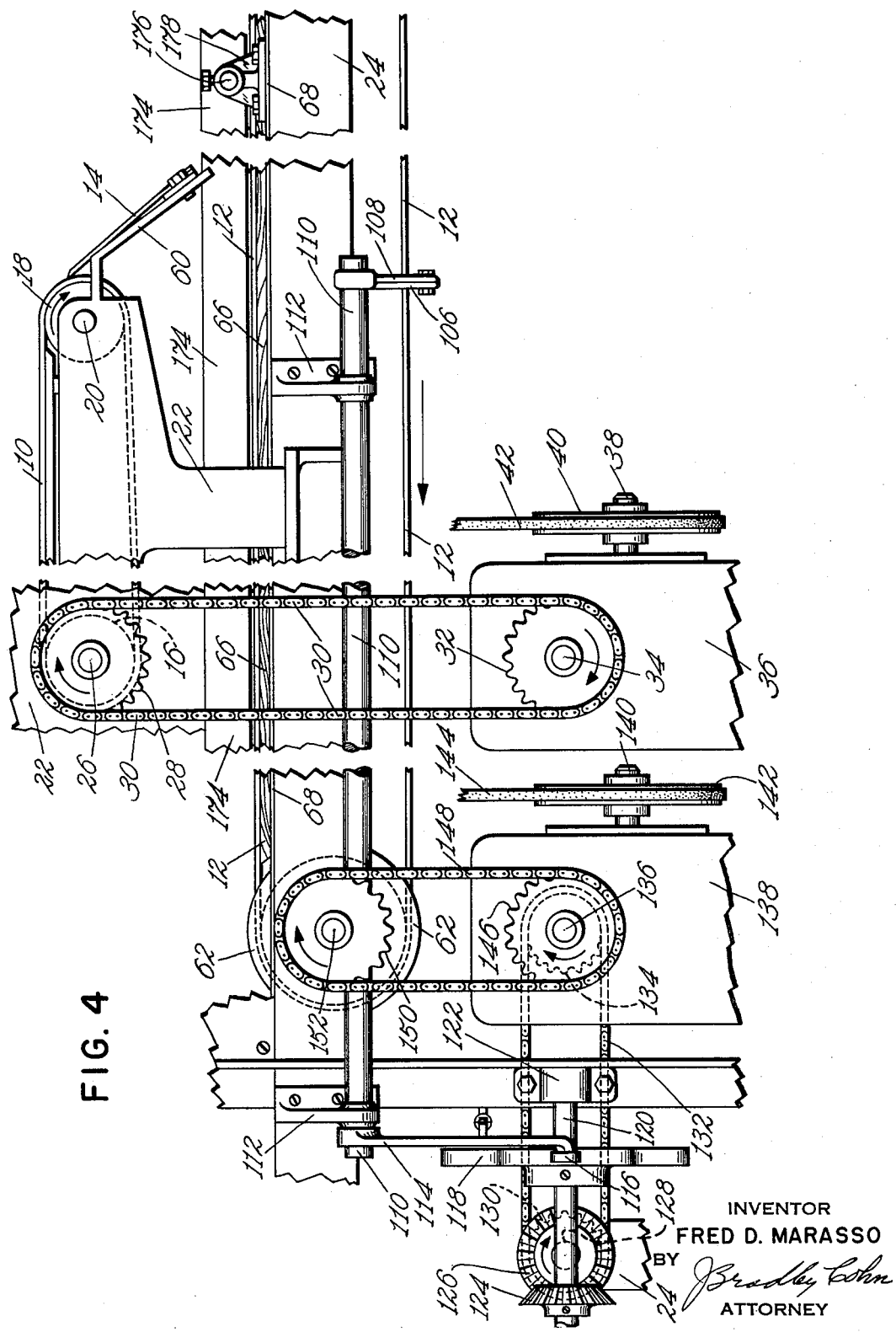

United States Patent Office 2,728,508
Patented Dec. 27, 1955

2,728,508

PAN INDEXING MECHANISM

Fred D. Marasso, Joliet, Ill., assignor to Union Machinery Company, a corporation of Illinois Application December 13, 1952, Serial No. 325,770

10 Claims. (Cl. 226—14)

This invention relates to panning articles such as dough or dough products. More particularly it relates to a novel indexing means for pans.

It is an object of the invention to provide a pan indexing means that is suitable for flat bottomed pans and for lipless pans.

My invention has particular usefulness in panning operations where it is necessary to provide an intermittent advancement of pans beneath a depositing or delivery device or devices in order to place thereon spaced rows of objects or portions of dough as the case may be.

In my pending application, S. N. 262,744 filed December 21, 1951, I disclose a means for indexing pans having cup indented bottoms. Such a device cannot operate effectively on flat bottomed pans. It is therefore an object of my invention to index the intermittent feed of pans by engaging the pan at the front and bottom thereof.

It is a further object of my invention to engage this portion of the pan at successive points to provide for depositing two or more spaced rows of articles per pan.

Moreover, it is an object of my invention to provide means for this type of pan indexing when lipless pans are employed. With lipless pans, the leading edge of the bottom of one pan contacts the following edge of the bottom of the prior pan. It is necessary to provide a separating or spacing means to permit engagement with the front and lower portion of each pan. It is thus a further object of my invention to provide a simple effective way of so separating the pans by tilting them as will appear from the following description and drawings.

In the accompanying drawings:

Fig. 3 is a side elevation of the panning end of the automatic moulding and panning machine as seen from line 3—3 of Fig. 2; and Fig. 4 is a side elevation of the machine as seen from line 4—4 of Fig. 2 illustrating the driving means of the dough piece delivery belt and the pan conveyor as well as the cam control for the pan indexing fingers.

Figure 1:
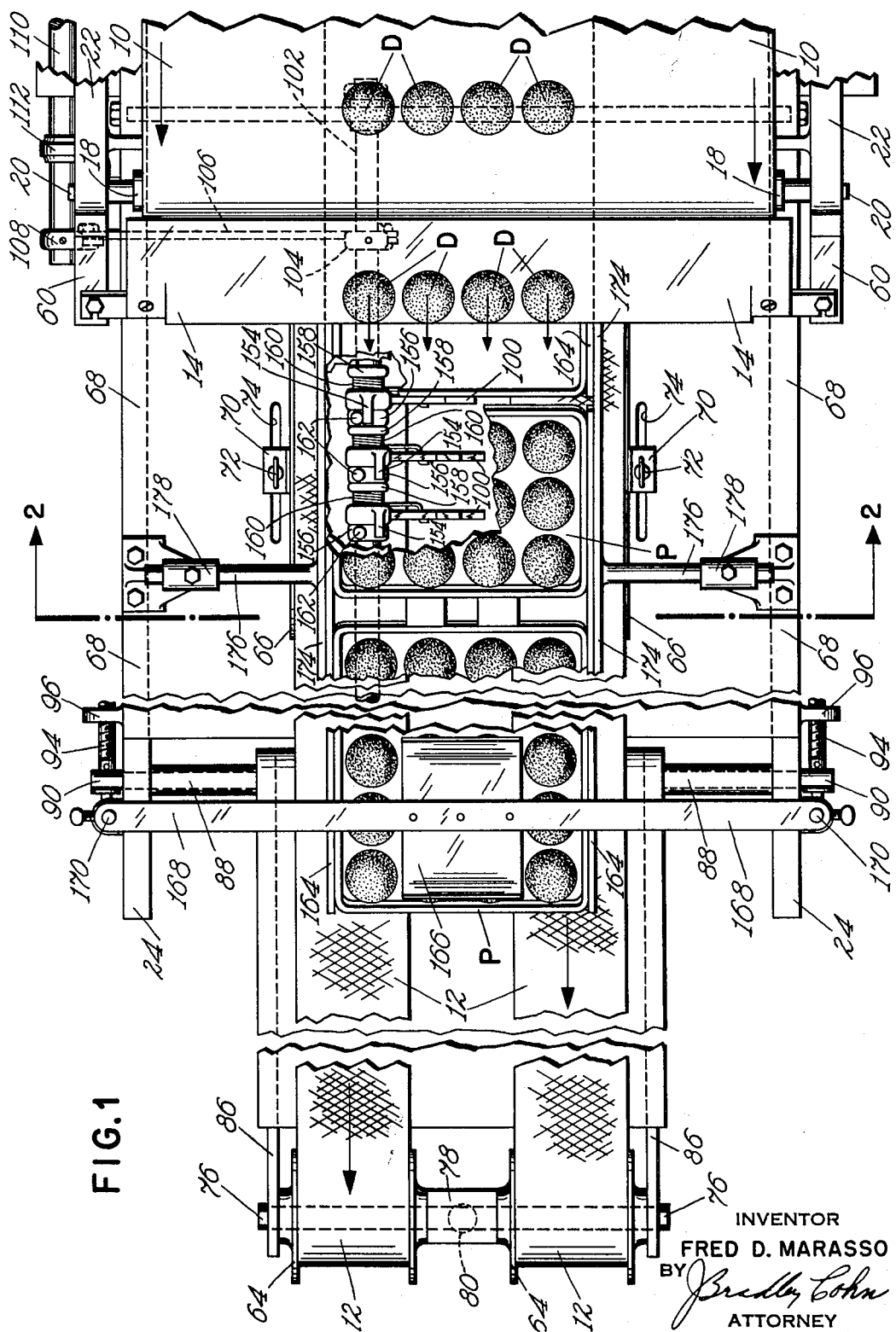
Fig. 1 is a partial plan view of the panning end of an automatic moulding and panning machine illustrating a plurality of spring-loaded successive pan stops employed for indexing flat bottomed pans.

With reference to the drawings, Figs. 1, 2, 3 and 4 illustrate the panning end of an automatic moulding and panning machine such as disclosed in my co-pending application, S. N. 262,744, in which rows of rounded dough pieces D are dropped or placed successively on a dough piece delivery belt 10 which in turn conveys them to and deposits them into intermittently arrested trays or pans P conveyed by a pair of continuously moving pan conveyor belts 12 passing beneath an inclined delivery plate 14 extending from the end of the continuously moving dough piece delivery belt 10.

Belt 10 is driven by means of a pulley or roller 16 (Fig. 4) and led over a guide roller 18 mounted on shaft 20 supported and fulcrumed in suitable bearings of a frame bracket 22 suitably secured to the frame structure 24 of the machine. Driving pulley 16 is mounted on a shaft 26 also supported in suitable bearings of frame bracket 22. Shaft 26 is driven from a sprocket 28 secured thereto (Figs. 2 and 4) which by means of a chain 30 is driven from a sprocket 32 secured to a shaft 34 extending from a gear reduction unit 36. This gear reduction unit 36 is continuously driven (Fig. 2) from motor 48 through motor shaft 46, Reeves pulley 44, belt 42 and pulley 38 on shaft 40 of unit 36.

Motor 48 is mounted on a pair of blocks 50 slidably engaging with suitable tracks (not shown) of a base plate 52. One of the blocks 50 is provided with a threaded bore engaged by the threaded portion of a horizontal spindle 54 rotatably secured in a suitable bearing lug 56 projecting upwardly from base plate 52. One end of the spindle 54 is provided with a hand wheel 58. Thus, by rotating the hand wheel 58 clockwise or counter-clockwise, motor 48 may be moved laterally towards or away from the gear reduction unit 36, to obtain variable speed control on the Reeves type split pulley.

Referring to Fig. 3, dough delivery plate 14 delivers the dough pieces D from the end of belt 10 into the pans P passing underneath. Plate 14 is secured to suitable lugs 60 extending from the ends of the frame brackets 22.

Figure 2:
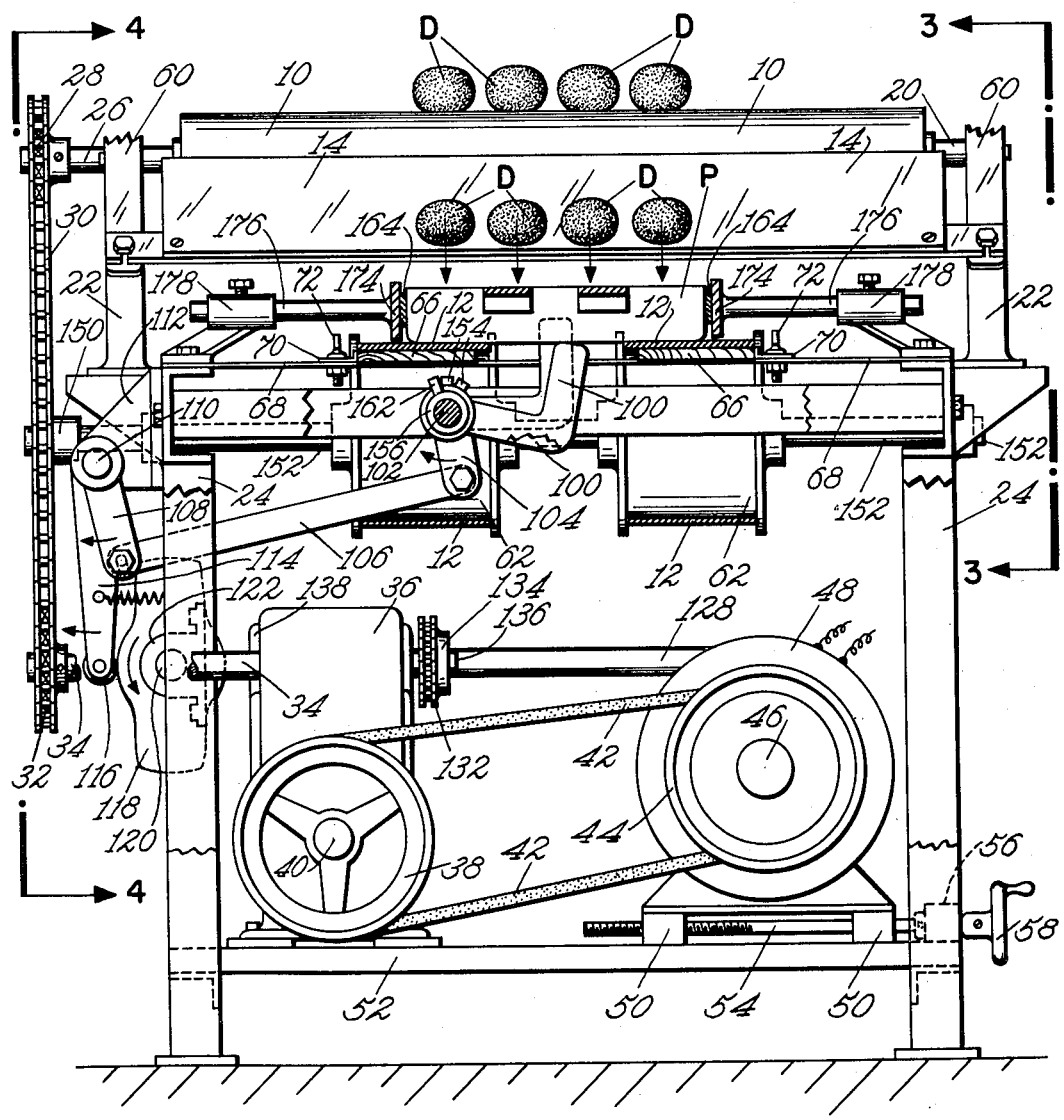
Fig. 2 is a sectional end elevation of the same taken from line 2—2 of Fig. 1.

The pair of endless belts 12 which carry and convey the pans P are driven by a pair of pulleys 62 (Fig. 4) and guided over a pair of idler pulleys 64 (Figs. 1, 2 and 3). The top portion of each belt 12 is also guided over a supporting member 66 which rests on a horizontal frame plate 68 secured to the top portion of the frame structure 24. To each belt supporting member 66 is fastened a bracket 70 carrying a thumb screw 72 which engages a slot 74 provided in frame plate 68. Slots 74 permit horizontal adjustment of supporting members 66 in the direction parallel to the belts 12 and hence adjustment of the locus of point S.

Idler pulleys 64 are mounted on a horizontal shaft 76 supported in the center by a bearing 78 secured to the top end of a vertical rod 80 engaging with its lower portion a vertical sleeve stand 82 provided with a clamp collar and screw 84 (Fig. 3) by means of which the rod 80 and therewith the bearing 78 is vertically adjustable. Each end of shaft 76 by means of a pair of links 86 is connected to a sleeve 88 loosely supported by a transverse horizontal shaft 90 supported at each end in horizontal slot 92 (Fig. 3) of frame structure 24. To each end of shaft 90 at right angles to its axis is rotatably attached the smooth cylindrical end of a spindle 94. The free threaded end of each spindle 94 engages a threaded lug 96 of the frame structure 24. Thus, the tension on belts 12 may be adjusted.

The pulleys 64 on shaft 76 are placed at a lower horizontal level than driving pulleys 62 so that belts 12 slope downwardly after leaving the foremost edges 67 (Fig. 3) of their respective horizontal supporting members 66. This causes a tilting and lifting of the trailing edge of the particular strap of pans P after its center of gravity or balance has passed the shaping point S of the belts 12. This lifting or raising of the trailing edge of a pan permits the registering or intermittent arrest of the following pan by the fingers 100 as illustrated in Fig. 3.

This lifting action is of great importance when lipless pans are used. Lipless pans, by their very nature, have no spacing between successive straps of pans. That is, the body of the leading pan of one strap will abut against the body of the last pan of the preceding strap. This, of course, prevents the insertion of a member, such as the fingers 100. With reference to Fig. 3, it may be seen that the right hand fingers 100 can engage the bottom edge of following pan P' without difficulty because the following edge and bottom of pan P is raised.

The L-shaped fingers 100 are spring-mounted on a rocker shaft 102 at spaced intervals corresponding to the distance the flat bottom pans P and P' are to be progressively advanced. Rocker shaft 102 is supported beneath the frame plate 68 by means of suitable bearings (not shown) provided in the frame structure of the machine. To rocker shaft 102 is secured an arm 104 which by means of a link 106 (Fig. 2) is connected to an arm 108 mounted on a horizontal shaft 110 supported by means of a pair of bearing brackets 112 attached to the frame structure 24 of the machine. To shaft 110 is also secured a cam lever arm 114 carrying on its free end a cam roller 116 engaging with a cam 118 mounted on a shaft 120 supported by suitable bearing brackets 122 fastened to the frame structure of the machine. To shaft 120 is secured a bevel gear 124 which is driven by a bevel gear 126 (Fig. 4) mounted on a cross shaft 128 supported by suitable bearings in the frame structure 24.

To shaft 128 is also secured a sprocket 130 which by means of a chain 132 is driven by a sprocket 134 mounted on a shaft 136 protruding from both sides of a gear reduction unit 138 which is of the same type as the unit 36 mentioned above. From unit 138 projects another shaft 140 on which is mounted a pulley 142 driven from and connected by means of a belt 144 to a Reeves type split pulley (not shown) which may be of the same type as the pulley 44 which drives the unit 36 mentioned above.

The Reeves type split pulley which drives the belt 144 is mounted on a shaft of an independent motor which in turn is also supported on tracks (not shown) and which also may be moved by means of a hand wheel (not shown) towards or away from the gear reduction unit 138 in the same fashion as motor 48 and therefore providing means for a variable speed drive for gear reduction unit 138. On shaft 136 is also mounted a sprocket 146 which by means of a chain 148 is connected to a sprocket 150 secured to a shaft 152 on which are mounted the driving pulleys 62 for the pan conveyor belts 12, so that any change in speed of the conveyor belts will also affect the speed or timing of the indexing fingers 100 which are actuated by means of cam 118.

Each finger 100 is loosely mounted on the rocker shaft 102 and provided with a horizontal lug 154. Adjacent one side of each finger is located an actuating member 156 secured to shaft 102 while adjacent the other side of each finger is provided a collar 158 also secured to shaft 102. A tension spring 160, positioned between each collar 158 and its respective finger 100, is anchored at one end to the collar while the other end engages the lower edge of the finger. Each actuating member 156 is also provided with a vertical pin or stud 162 which engages horizontal lug 154 to act as a stop against the action of spring 160 upon its finger 100.

This pan indexing mechanism operates without difficulty on flat bottomed as well as snugly fitting lipless pans. The drawings illustrate conventional "straps" of three such flat bottomed, lipless pans P, P'. These pans are connected by side straps 164. In the drawings and in the following description, pan straps of three pans each and holding three rows of dough pieces per pan are shown. It is, of course, evident that different sizes of pans and/or a different number of pans per strap could be employed.

In operation, the indexing fingers are oscillated, i. e., raised and lowered by the properly timed oscillating motion of rocker shaft 102 actuated by means of cam lever 114 from cam 118. The number of indexing fingers, of course, have to correspond with the number of rows of doughpieces to be deposited in each single pan. The pans P are forwarded on the continuously moving conveyor belts 12 towards the loading station where the leading edge of the pan engages the first indexing finger 100 for a short temporary arrest during which a row of dough pieces D is deposited from delivery plate 14 into the pan. The arrest time is controlled by the shape as well as the speed of index cam 118. When cam roller 116 on lever 114 moves onto the high portion of cam 118 all fingers are momentarily retracted, i. e., moved downward, permitting the pan to resume its forward travel on the belts 12. The fingers are retracted but a short period of time and then raised again with the second finger in the path of the pan. The first index finger contacts the bottom of the pan and spring 160 yields. After the second row of dough pieces are deposited, the index fingers are again momentarily retracted and the cycle repeated on the third finger.

In using lipless pans, as illustrated, the trailing end T of the leading pan strap and the forward end F of the following pan butt close together and must be separated before the first index finger can project into the path of the following pan and arrest the same. The separation, as illustrated in Fig. 3, is effected when the center of gravity or balance point of the preceding pan passes over the adjustable sloping point S of the belts 12 mentioned heretofore which causes the forward end of said pan to dip downward onto inclined portions 13 of belts 12 while the rear or trailing end of said pan is lifted high enough to permit index finger 100 to come upward and into the path of the leading edge of the following pan. In order to assure positive dipping action of the pans an inclined deflector plate 166 is provided. The latter is mounted above the pans at the proper point of the pan conveyor and is supported by means of a cross bar 168 adjustably secured at each end to a pair of vertical rods 170 mounted on suitable lugs 172 projecting from the frame structure 24.

In order to properly guide the pans P while being conveyed by belts 12 a pair of adjustable side guide rails 174 are provided. The latter are secured to suitable horizontal rods 176 adjustably supported by and secured to brackets 178 mounted on plate 68 and frame structure 24.

In order to provide means for adjusting the lateral distance between the index fingers 100 the actuating members 156 and collars 158 are provided with set screws 180 and 182 (Fig. 3), respectively, so that the index fingers 100 can be set to correspond with the distance between the rows of dough pieces to be deposited.

While I have shown a preferred embodiment of my invention, it is obvious that variations are possible within the scope of the invention as set forth in the appended claims. For example, it may be desirable, or more facile, to engage pans on or near their sides and lateral leading edges.

I claim:

1. In a pan indexing mechanism suitable for passing pans intermittently beneath a depositing device, a continuously running conveyor belt whereon a plurality of pans may be placed for movement therewith, said belt contacting less than the total bottom surface of said pans and so constructed and arranged to provide a section through which a member may be projected to engage a bottom portion of a pan, a horizontal rock shaft positioned below and longitudinal with said belt, a plurality of stop members mounted on said rock shaft beneath said belt for movement between points above and below the surface of said belt into and out of pan engaging position above said belt, all of said members being resiliently mounted on said rock shaft so that they may be moved into pan engaging relationship in front of one of said pans and will be depressed by said pans if moved into pan engaging relationship while said pans are passing over said stop members, and means to actuate said plurality of fingers at predetermined time intervals to move said fingers simultaneously into pan engaging and releasing position whereby said fingers will progressively contact the leading bottom edge of said pan to arrest the movement of said pan and said other fingers engaging the bottom of a pan will be depressed against said resilient mounting and held by said pan in inoperative position.

2. A device as claimed in claim 1 and further characterized by a member engaging and raising the upper operative run of said continuously running belt at a point beyond the first of said plurality of fingers to provide an incline in said run of said belt in a plane other than the plane at which said run approaches said point whereby the trailing bottom edge of a pan passing over said first finger is raised to permit said finger to move above said belt level to engage the leading end of the next succeeding pan.

3. The combination in a dough panning machine of a continuously running endless conveyor for advancing spaced rows of dough pieces continuously forward to a delivery end, a second continuously running endless conveyor positioned beneath and extending forwardly of the delivery end of said first-named conveyor, said second continuously running conveyor being adapted to support and advance a plurality of pans beneath said delivery end, drive means for said first-named conveyor, a rock shaft mounted beneath and longitudinal to said second-named conveyor, a plurality of finger-like members secured to said rock shaft, means operative to rock said rock shaft at spaced time intervals, drive means to drive said second-named conveyor and said means to rock said rock shaft, whereby the motion of said rock shaft will move said finger-like members into and out of engagement with the pans on said second-named conveyor to intermittently arrest the movement of said pans to receive said dough pieces from the delivery end of said first-named conveyor.

4. In a mechanism for intermittently arresting the movement of pans fed forward along a conveyor, a continuously running substantially horizontal conveyor supporting said pans, said conveyor so constructed and arranged as to expose a portion of the bottom of said pans, a rock shaft mounted longitudinally of said conveyor, a lever on said rock shaft, cam means engaging said lever to rock said rock shaft, at least two finger-like members mounted at their one end on said rock shaft to be swung by the motion of said rock shaft to move their free end into and out of engagement with the portion of the bottom of said pans exposed along said conveyor, drive means to continuously drive said conveyor and said cam whereby said finger-like members will engage and arrest said pans during predetermined time intervals and during the movement of said conveyor.

5. A claim according to claim 4, further characterized in that the upper run of said conveyor is supported in a slightly higher plane during that portion of the run prior to the first of said finger-like members in the direction of movement of said conveyor so that it declines subsequent to the first of said members toward the delivery end roller whereby the trailing edge of one of said pans is raised slightly from the surface of said conveyor to permit said finger-like members to engage between said trailing edge and the leading edge of the next successive pan.

6. In a dough panning machine having an endless conveyor for advancing a plurality of pans forward and finger-like members for engaging the leading end of each of said pans in succession to arrest its motion on said conveyor, a member mounted beneath an operative run of said conveyor to slightly distort said conveyor so that said operative run of said conveyor runs in different planes before and after said member whereby the trailing edge of a pan is partially separated from the leading edge of the next advancing pan to permit said finger-like members to engage said subsequent leading edge.

7. In a panning machine wherein pans are intermittently fed past a delivery device, a pair of parallel continuously running endless conveyors mounted in side by side spaced relation, said conveyors being suitable to support thereon the lateral bottom portions of a plurality of pans and leaving unsupported intermediate portions, a rock shaft mounted longitudinally said conveyors, a plurality of finger-like levers resiliently mounted at their one end along said rock shaft at spaced intervals to move with said rock shaft to swing their free ends into and out of engagement with the leading edge of a pan moving along said conveyor, said resilient mounting permitting said finger-like member to be depressed by the weight of one of said pans despite the movement of said rock shaft, and means to rock said rock shaft whereby said pans may be intermittently advanced from one finger-like member to the next.

8. In a dough panning machine having an endless conveyor for advancing a plurality of pans forward and finger-like members for engaging the leading end of each of said pans in succession to arrest its motion on said conveyor, a member mounted along the operative run of said conveyor to displace the trailing edge of a pan to expose a portion of the leading edge of the next successive pan into engagement by one of said finger-like members.

9. The combination in a dough panning machine of a continuously running endless conveyor for advancing spaced rows of dough pieces continuously forward to a delivery end, a second continuously running endless conveyor positioned beneath and extending forwardly of the delivery end of said first-named conveyor, said second continuously running conveyor being adapted to support and advance a plurality of pans beneath said delivery end, drive means for said first-named conveyor, a rock shaft mounted parallel and longitudinal to said second-named conveyor, a plurality of finger-like members secured to said rock shaft, means operative to rock said rock shaft at spaced time intervals, drive means to drive said second-named conveyor and said means to rock said rock shaft, whereby the motion of said rock shaft will move said finger-like members into and out of engagement with the pans on said second-named conveyor to intermittently arrest the movement of said pans to receive said dough pieces from the delivery end of said first-named conveyor.

10. In a mechanism for intermittently arresting the forward movement of pans, a continuously running substantially horizontal conveyor supporting said pans, said conveyor constructed and arranged so as to expose a portion of the bottom of said pans, a rock shaft mounted longitudinally of said conveyor, a plurality of finger-like members secured to said rock shaft, said finger-like members resiliently mounted at their one end along said rock shaft at spaced intervals to move with said rock shaft to swing their free ends into and out of engagement with the leading end of said exposed portion of said pans moving along said conveyor, and means to rock said rock shaft during the advancement of said conveyor whereby the said free ends of said finger-like members will engage and arrest said pans at predetermined time intervals during the movement of said conveyor.

References Cited in the file of this patent

UNITED STATES PATENTS

| 1,633,014 | Harber | June 21, 1927 |
| 1,781,546 | Harber | Nov. 11, 1930 |
| 2,590,823 | Rhodes | Mar. 25, 1952 |